L. S. PACE & J. F. OSBORNE.
PNEUMATIC SHOCK ABSORBER.
APPLICATION FILED SEPT. 9, 1912.
1,069,574. Patented Aug. 5, 1913.
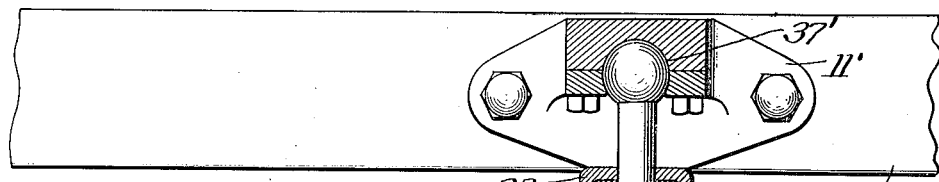
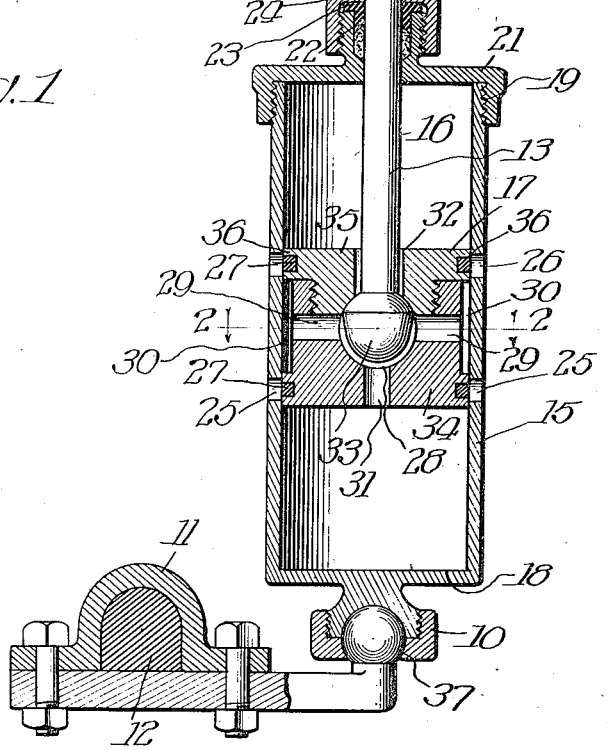
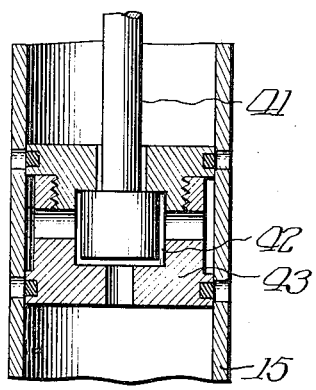
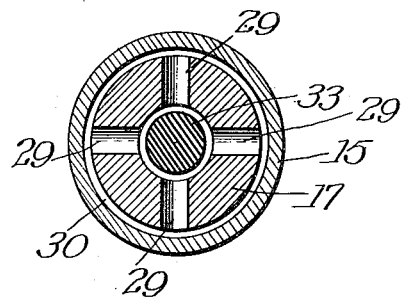

UNITED STATES PATENT OFFICE.

LOUIS S. PACE AND JOSEPH F. OSBORNE, OF IRONATON, ALABAMA.

PNEUMATIC SHOCK-ABSORBER.

1,069,574.                    Specification of Letters Patent.    Patented Aug. 5, 1913.

Application filed September 9, 1912. Serial No. 719,503.

*To all whom it may concern:*

Be it known that we, LOUIS S. PACE and JOSEPH F. OSBORNE, citizens of the United States, residing at Ironaton, in the county of Talladega and State of Alabama, have invented certain new and useful Improvements in Pneumatic Shock-Absorbers, of which the following is a specification.

Our invention relates in general to shock absorbers for automobiles and other vehicles, and more particularly to shock absorbers of the pneumatic type wherein a cushion of air is provided to take up the shocks and jars received by the chassis or running gear.

One of the principal aims of this invention is to provide a pneumatic shock absorber wherein springs, check and regulating valves will be eliminated, and the number of relatively moving parts reduced to a minimum.

A further object of the invention is to provide a pneumatic shock absorber which will automatically respond to all road conditions, the degree of relative movement between the parts increasing as shocks and jars to the vehicle become more violent and diminishing as they diminish.

A still further object of the invention is to provide a pneumatic shock absorber wherein the compression of the air forming the cushion which absorbs the jolts and jars of the chassis or running gear will be gradual, and the air forming the cushion released at exactly the proper instant.

An additional object of the invention is to provide a shock absorber wherein the force supporting the body of the vehicle will lie always along the central axis of the absorber, preventing thereby any binding between the relatively moving parts and any concentrated friction therebetween.

A still further object of the invention is to provide a shock absorber which will be exceedingly simple and efficient in operation, and cheap to manufacture.

Additional objects and advantages of the invention will be apparent as it is better understood from the following description which, taken in connection with the accompanying drawing, illustrates two preferred embodiments thereof.

On the drawing:—Figure 1 is a central vertical sectional view of a shock absorber made in pursuance of our invention; Fig. 2 is a horizontal sectional view taken on the line 2—2 of Fig. 1, and Fig. 3 is a partial vertical sectional view showing a slightly modified form of the absorber disclosed in Figs. 1 and 2.

For the purpose of illustrating our invention we have shown a shock absorber embodying various features thereof in operative position upon a vehicle, the shock-receiving member 10 being secured by means of the clamp 11 to the axle 12 of the vehicle, and the protected member 13 to its body 14 by means of the clamp 11'. The shock absorber consists primarily of a cylinder 15, a supporting or piston-rod 16 and a piston 17.

The cylinder 15 has a permanent closure 18 at one end which is preferably, as shown on the drawings, formed integrally with the side walls of the cylinder. The other end 19 of the cylinder is threaded to receive a cap or hermetic closure 21 having a central aperture through which the piston-rod 16 is adapted to reciprocate. A stuffing-box 22 provided with suitable packing 23 and held in place by the gland 24 prevents the leakage of air through the cap or closure 21 around the piston-rod. Extending through the sides of the cylinder 15 are provided two sets of air ports 25 and 26, arranged in parallel planes perpendicular to the axis of the cylinder and preferably at equal distances from its center.

The piston 17, which is mounted to reciprocate within the cylinder, is provided with a pair of packing rings 27 which are adapted to form an air-tight closure between the cylindrical side of the piston and the inner surface of the wall of the cylinder. About the cylindrical wall of the piston and intermediate the edges thereof the surface of the piston is cut away to provide an air chamber 30 extending between the lateral side of the piston and the wall of the cylinder. Within the piston is provided a spherical recess 28 which communicates by means of a plurality of passageways 29 with the air space surrounding the piston. Extending downwardly from the recess 28 and communicating with the air chamber beneath the piston is a cylinder passageway 31, whose use will be hereinafter described. An end 33 of the piston-rod 16 is normally disposed in the recess 28, and to this end an aperture 32 is provided in line with and above the aperture 31. The aperture 32 is substantially larger than the portion of the piston-rod adjacent the end 33, which is disposed in the recess 28 in order that an air passage may be provided between the recess 28 and the upper air chamber above the piston. In order that the device may be readily and easily assembled with the end 33 of the piston-rod disposed in the recess 28 we form the piston of two parts 34 and 35 which are when the parts as assembled, held in threaded engagement with each other as shown in Fig. 1. The end 33 of the piston-rod is enlarged, and is shaped to engage the walls of the recess 28 adjacent the apertures 31 and 32, closing the said apertures, and permitting the piston-rod to act as a valve for the alternate closing of these ports. The edges of the piston 36 which are in contact with the side walls should be of sufficient width and spaced apart a sufficient distance to permit them to cover the ports 25 and 26 when the parts are in central position.

In order that the weight carried by the absorber shall always lie along its central longitudinal axis we provide a ball and socket joint 37 connecting the clamp 11 with the cylinder 15, and a similar connection 37' between the upper end of the piston-rod 16 and the clamp 11'.

In Fig. 3 a piston-rod 41 is provided with a cylindrical head which fits in a similarly shaped but somewhat larger recess 42 in the piston 43. Except for this difference the two embodiments of the invention are identical, and it is not thought that Fig. 3 need be further described. This difference does not produce any difference in the operation of the two embodiments, and a description of the operation of the shock absorber shown in Figs. 1 and 2 will with equal accuracy describe the operation in the embodiment shown in Fig. 3. This operation is as follows:—When the axle 12 receives a jar the cylinder 15 will be moved suddenly upwardly, the weight carried by the piston moving it relatively to the cylinder a degree proportionate to the violence of the shock sustained by the axle. This movement will cut off communication between the passageway 31 and the recess 30 and establish communication between the passageway 32 and this recess, thereby temporarily hermetically sealing the air space beneath the piston. As the piston moves down both sets of ports 25 and 26 are thrown into communication with the air space above the piston, the ports 25 by the passageway 29 and 32 and the ports 26 by being directly connected thereto at the edges of the piston uncover these ports. The air trapped beneath the piston thus forms an elastic air cushion which absorbs the shock received by the axle 12. The elasticity of the air and the springs of the vehicle now move the piston-rod upwardly within the cylinder, immediately releasing the air compressed beneath the piston by establishing communication between the bottom of the cylinder and the ports 25 through the passageways 31 and 29. The piston almost immediately starts to move upwardly as the head or end of the rod engages the sides of the recesses adjacent the passageway 32, closing the same and lifting the piston. When the movement of the piston-rod has carried the piston upwardly until the ports 26 are closed an air cushion is formed above the piston to prevent jars or shocks resulting from the rebound.

It is thought that the invention and many of its attendant advantages will be understood from the foregoing without further explanation, and it is apparent that various changes may be made in the form and arrangement of the parts without departing from the spirit and scope of the invention or sacrificing any of its advantages, the forms hereinbefore disclosed being merely preferred embodiments thereof.

We claim:—

1. A shock absorber comprising a cylinder having an air port in its side, a piston mounted within the cylinder and adapted to form an air cushion in either end of the cylinder, said piston being provided with means for establishing communication between an end of the cylinder and the said air port before the piston uncovers the said port to said air cushion.

2. A shock absorber comprising a cylinder, a piston mounted in said cylinder adapted to form an air cushion in either end thereof and provided with a piston rod disposed through an end of the cylinder and with means for establishing communication between said air cushion and the external air before movement of the piston after forming the said air cushion.

3. A shock absorber comprising a cylinder having air ports in its side at different distances from an end thereof, a piston movable in said cylinder and adapted to form an air cushion in an end thereof, said piston being provided with means for successively establishing communication between the said air ports and the said air cushion before the piston uncovers said ports upon its return movement.

4. A shock absorber comprising a cylinder having air ports in its side at different distances from an end thereof, and a piston mounted within the cylinder adapted to form an air cushion in an end thereof, said piston being provided with means for simultaneously establishing communication between the said air ports and the other end of the cylinder upon its forward movement.

5. A shock absorber comprising a cylinder having a plurality of air ports in its side at different distances from an end thereof, a piston provided with intersecting passageways, and means disposed at the intersection of said passageways for closing the same to provide an air cushion in one end of the cylinder upon movement of the piston and simultaneously establish communication between the other end and said air ports.

6. A shock absorber comprising a cylinder having a plurality of air ports in its side at different distances from an end thereof, a piston disposed in the said cylinder having passageways disposed therethrough, means mounted in the said passageways for closing the same from an end of the cylinder to form an air cushion therein when the piston is moved toward the said end and to simultaneously establish communication between the said air ports and the other end of said cylinder, said means being adapted to establish communication between the said air cushion and the said air ports upon return movement of the said piston before the said piston uncovers the said ports.

7. A shock absorber comprising a cylinder having a plurality of air ports in its side and at different distances from an end thereof, a piston disposed in said cylinder having passageways disposed therethrough, a piston, a piston rod, means mounted in the said passageways for closing the same from an end of the cylinder to form an air cushion therein when the piston is moved toward the said end and to simultaneously establish communication between the said air ports and the other end of said cylinder, said means being adapted to establish communication between the said air cushion and the said air ports upon return movement of the said piston before the said piston uncovers the said ports.

8. A shock absorber comprising a cylinder having a plurality of air ports in its side and at different distances from an end thereof, a piston disposed in said cylinder having passageways disposed therethrough, a piston rod, means mounted in the said passageways and operable by the said piston rod for closing the same from an end of the cylinder to form an air cushion therein when the piston is moved toward the said end and to simultaneously establish communication between the said air ports and the other end of said cylinder, said means being adapted to establish communication between the said air cushion and the said air ports upon return movement of the said piston before the said piston uncovers the said ports.

9. A shock absorber comprising a cylinder hermetically sealed at its ends and having a pair of air ports in its side at different distances from one of its ends, a reciprocatory rod disposed through one end of the said cylinder, a piston normally closing both of said air ports and having a passageway adapted to establish communication between an end of the cylinder and the air port farthest therefrom, and connections between the said piston and rod for moving the said piston away from the said end of the cylinder and simultaneously establishing communication between both air ports and the said end of the cylinder.

10. A shock absorber comprising a cylinder hermetically sealed at its ends and having a pair of air ports in its side and at different distances from one of its ends, a piston mounted within the cylinder normally closing both air ports and provided with a passageway adapted to establish communication between either end of the piston and either air port, a reciprocatory rod disposed through an end of the cylinder and having its ends disposed in the said passageway and adapted to establish communication between one end of the cylinder and the air port farthest removed therefrom when the piston moves toward the other end of the cylinder.

11. A shock absorber comprising a cylinder hermetically sealed at its ends and having a pair of air ports in its side and at different distances from one of its ends, a piston normally closing both air ports provided with passageways communicating with both ends of the cylinder and with the side of the piston adjacent the air ports, said passageways intersecting at the center of the piston, a reciprocatory rod disposed through an end of the cylinder and having a head disposed in the said passageway communicating with the ends of the cylinder to establish communication between an end of the cylinder and the port farthest therefrom when the piston moves toward the other end of the said cylinder.

12. A shock absorber comprising a cylinder hermetically sealed at its ends and having a pair of air ports in its side and at different distances from one of its ends, a piston normally closing both air ports provided with a recess at its center and having passageways leading from the said recess to both ends of the cylinder and to the side of the piston adjacent the air port, a reciprocatory rod disposed through an end of the cylinder and having a head disposed in the said recess adapted to form a valve for controlling the passage of air through the passageways communicating with the ends of the cylinder and adapted to establish communication between an end of the cylinder and the port farthest therefrom when the piston moves toward the other end of the cylinder.

LOUIS S. PACE.
JOSEPH F. OSBORNE.

Witnesses:
BRYCE H. KELLEY,
CHAS. R. DENT.